United States Patent [19]

Kinoshita et al.

[11] Patent Number: 5,466,998
[45] Date of Patent: Nov. 14, 1995

[54] ELECTRIC SYSTEM FOR AN ELECTRIC VEHICLE

[75] Inventors: Shigenori Kinoshita; Takao Yanase; Koetsu Fujita, all of Kanagawa, Japan

[73] Assignee: Fuji Electric Co., Ltd., Kawasaki, Japan

[21] Appl. No.: 210,021

[22] Filed: Mar. 18, 1994

[30] Foreign Application Priority Data

Mar. 19, 1993 [JP] Japan .................... 5-085536

[51] Int. Cl.⁶ .................... H02P 5/40; B60L 7/22; G01R 27/26
[52] U.S. Cl. .................... 318/375; 318/376; 318/139; 318/762
[58] Field of Search .................... 318/138, 139, 318/370–389, 800–820, 34–40, 98, 99, 762; 324/433, 427, 677, 678; 320/43, 48; 363/39; 307/10; 180/65.2, 65.3

[56] References Cited

U.S. PATENT DOCUMENTS

| | | | |
|---|---|---|---|
| 4,082,988 | 4/1978 | Reime et al. | 318/139 |
| 4,199,037 | 4/1980 | White | 180/65 C |
| 4,240,015 | 12/1980 | White | 318/338 |
| 4,284,936 | 8/1981 | Bailey et al. | 318/381 |
| 4,388,573 | 6/1983 | Horiuchi et al. | 318/376 |
| 4,482,848 | 11/1984 | Heal et al. | 318/98 |
| 4,558,281 | 12/1985 | Codd et al. | 324/433 |
| 4,904,918 | 2/1990 | Bailey et al. | 318/762 |
| 5,119,011 | 6/1992 | Lambert | 320/43 |
| 5,245,294 | 9/1993 | Kuma | 324/677 |
| 5,291,388 | 3/1994 | Heinrich | 363/98 |
| 5,318,142 | 6/1994 | Bates et al. | 180/65.2 |
| 5,331,261 | 7/1994 | Brown et al. | 318/376 |

FOREIGN PATENT DOCUMENTS 58-116002  7/1983  Japan .

*Primary Examiner*—Paul Ip
*Attorney, Agent, or Firm*—Brumbaugh, Graves, Donohue & Raymond

[57] ABSTRACT

In an electric system for an electric vehicle, DC power of a main battery is converted into AC power by an inverter which has a power regenerative function. At startup, the system charges an input smoothing capacitor on the DC side of the inverter through an initial charging circuit with an initial charging switch and resistor. A main circuit switch that can stop current is connected between the main battery and the inverter. A rheostatic braking circuit with a rheostatic braking switch and a braking resistor is connected to the DC input side of the inverter for rheostatic breaking when required. Rheostatic braking takes over after regenerative braking when the main battery loses its power absorption capability, with the main circuit switch off. Semiconductors can be used as switches, and can be placed on a cooling body or modularized. Low-noise wires can be used to reduce noise.

9 Claims, 3 Drawing Sheets

ELECTRIC SYSTEM FOR AN ELECTRIC VEHICLE

BACKGROUND OF THE INVENTION

The present invention relates to an electric system for an electric vehicle with a battery as a power supply. The battery may be a secondary battery, e.g., in a hybrid propulsion system.

A conventional system of this type is illustrated by FIG. 8 which shows an electric system with an AC motor for driving two wheels of a vehicle, and circuitry to power the motor and to provide for recharging of the battery during braking. The system includes a main battery 1, a fuse 2, a main circuit switch 3, an inverter 4, an AC motor 5, a differential gear 6, wheels 71 and 72, an initial charging circuit 8 for charging an input smoothing capacitor of the inverter, and a rheostatic braking circuit 9'. The charging circuit 8 includes an initial charging switch 81 and a charging resistor 82.

The inverter 4 typically consists of a three-phase transistor inverter as shown in FIG. 9, comprising a transistor 401 and a diode 402 connected in reverse-parallel to the transistor 401, together forming a switching arm. The three-phase inverter comprises six such switching arms.

An input smoothing capacitor 403 for inputting voltage to the inverter is connected to inverter 4 to smooth current from the main battery 1.

In operation of a conventional system, with reference to FIGS. 8 and 9, the main circuit switch 3 operates or stops the electric vehicle depending on whether it is switched on or off, and protects the main circuit. The fuse 2 further protects against damage that may not be prevented by the main circuit switch 3.

Since the input smoothing capacitor 403 is connected on the DC input side of the inverter 4 when the main circuit switch 3 is switched on to charge the capacitor 403 from the main battery 1 upon starting the inverter 4, the voltage of the capacitor 403 becomes twice that of the main battery 1 due to the inductance of the power line of the main circuit.

As a countermeasure, an initial charging circuit 8 is included. When the inverter 4 is started, the initial charging switch 81 is switched on while the main circuit switch 3 remains switched off. This results in charging of the input smoothing capacitor 403 for the inverter via the charging resistor 82. The resistance of the resistor 82 is selected so as to prevent resonance between the resistor 82 and the input smoothing capacitor 403 during initial charging. Thus, initial charging does not raise the capacitor voltage above the main battery voltage.

In the system of FIG. 8, the inverter 4 converts the DC power of the main battery 1 into AC power to control the torque and the speed of the AC motor 5. By the differential gear 6, torque is transmitted at reduced speed to the right and left wheels 71 and 72. In the motoring mode of the electric vehicle, the inverter 4 converts battery DC power to motor AC power, to drive the wheels 71 and 72, and thus to propel the vehicle.

Typically, in a braking mode of the electric vehicle, regenerative braking is used for more efficient use of the main battery 1. During braking as contrasted with motoring, the inverter 4 serves for AC to DC power conversion in regenerating kinetic energy of the vehicle via the wheels 71 and 72 and the motor 5 as DC power to the main battery. During such braking, the motor 5 functions as an electric generator.

An electric vehicle requires a braking performance comparable to a vehicle with an internal combustion engine. In particular, when going downhill, electric braking should be equivalent to engine braking.

This poses no difficulties so long as the main battery 1 can absorb the braking power. When the energy capacity of the battery is reached, however, regenerative braking fails.

For this eventuality, a rheostatic braking circuit 9' is included with the main circuit, as shown in FIG. 8. Since the rheostatic braking circuit 9' typically comprises a semiconductor power converter and a braking resistor so that it can alter the electric braking power according to the applied braking force, the braking system is complex and expensive.

During rheostatic braking in the electric system in FIG. 8, the power and current controlled by the power converter is applied to the braking resistor in the rheostatic braking circuit 9', and electromagnetic noise from the rheostatic braking circuit 9' may interfere with the vehicle's radio or telephone.

The following are design criteria for an improved electric system and equipment for an electric vehicle: (1) small size and light weight, (2) low manufacturing costs, (3) low maintenance requirements, (4) high system efficiency, (5) operability comparable to a vehicle with an internal combustion engine, and (6) low radio-frequency noise emission from the equipment and its power line.

SUMMARY OF THE INVENTION

Consonant with these design criteria, an improved electric system for an electric vehicle includes a rheostatic braking circuit comprising a rheostatic braking switch and a braking resistor, for rheostatic braking when regenerative braking is disabled. Thus, reliable electric braking is realized independently of the charging state of the main battery.

Advantageously, the charging resistance of an initial charging circuit for an inverter input voltage smoothing capacitor is substantially the same as the braking resistance of the rheostatic braking circuit, so that same resistors can be used for the initial charging circuit and for rheostatic braking. Thus, as compared with conventional circuits, the number of resistors can be halved.

The braking force during rheostatic braking can be controlled by changing the voltage even though the braking resistance remains constant.

Since the switching frequency of a main circuit switch is usually low, low-loss semiconductor switches can be used as switches for initial charging, for rheostatic braking, and for main circuit switching, with the benefit of reduced maintenance by elimination of mechanical contacts.

Conveniently, the semiconductor components can be mounted on a common cooling body, thus forming a compact, low-cost module which is readily inspected and maintained.

A preferred system, preferably with low-noise connecting wires, produces little radio-frequency noise.

DETAILED DESCRIPTION OF PREFERRED EMBODIMENTS

Figure 1:
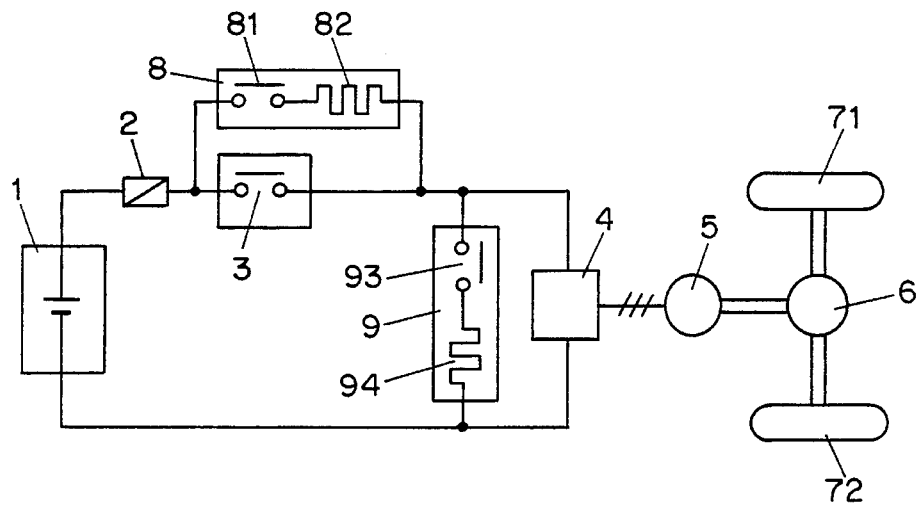
FIG. 1 is a schematic of a preferred first embodiment of the invention.
Figure 8:
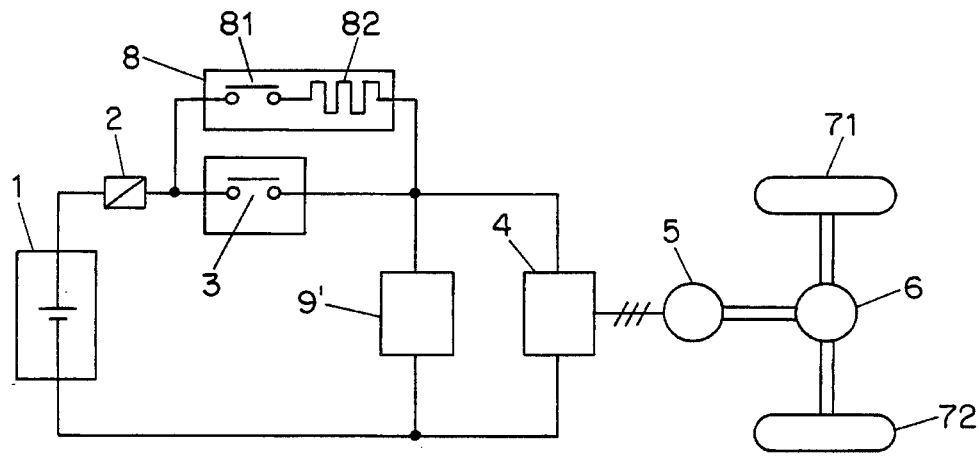
FIG. 8 is a schematic of a conventional electric system for electric vehicles.
Figure 9:
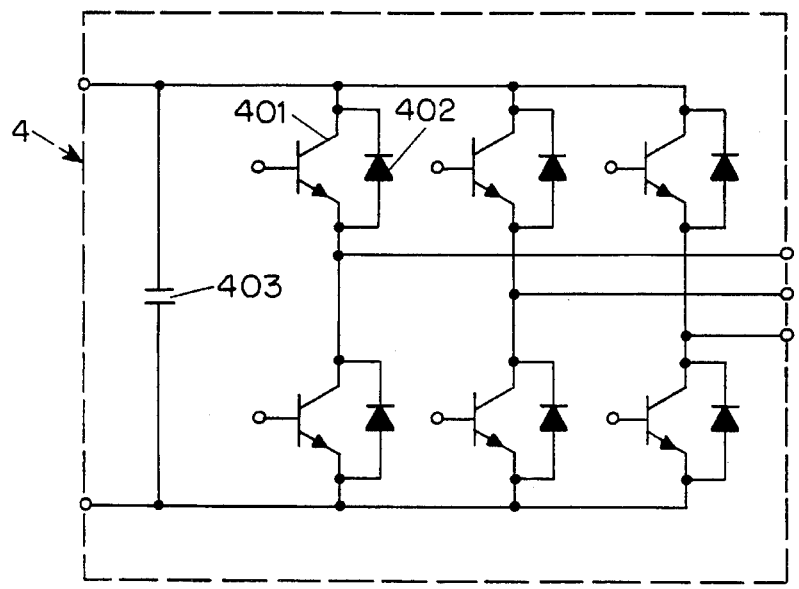
FIG. 9 is a circuit diagram of a conventional three-phase transistor inverter as included in the system of FIG. 8.

For ease of comparison of FIG. 1 with FIG. 8, like components have the same reference numerals. FIG. 8 is as described above. FIG. 1 further shows a rheostatic braking circuit 9 comprising a rheostatic braking switch 93 and a braking resistor 94 in series connection. The rheostatic braking circuit 9 becomes operational upon closing of the rheostatic braking switch 93, at which time the main circuit switch 3 is switched off.

Operation in the initial charging mode of the input smoothing capacitor of the inverter and in the motoring mode are the same as described for FIG. 8.

Braking operation is different. So long as the main battery 1 can absorb power, braking is regenerative, and regenerated power is absorbed by the main battery 1. During regenerative braking, the switch 93 is switched off, and regenerated power reaches the main battery 1 via the main circuit switch 3 and the fuse 2.

Also, the charging state of the main battery 1 is monitored during regenerative braking. When the main battery 1 is fully charged by regenerative braking, the rheostatic braking switch 93 is switched on and the main circuit switch 3 remains switched off.

This switching from regenerative to rheostatic braking is effected automatically, based on monitoring of the charging state of the main battery 1. As is well known, at the point of full charging of the main battery 1, the charging voltage rises sharply. Thus the charging state of the main battery 1 can be monitored by monitoring the main battery voltage by well known means.

Control and adjustment of the braking force during rheostatic braking may be described in the following terms: Power (P) is consumed by the braking resistor during rheostatic braking according to the equation $$P=E_d^2/R_B$$

In this equation, $E_d$ denotes the DC input voltage to the inverter, and $R_B$ denotes the resistance of the rheostat. According to the equation, the power P can be adjusted by changing the DC voltage $E_d$ even when the resistance $R_B$ remains constant. With constant resistance $R_B$, the braking power can be adjusted by changing the value of the DC input voltage of the inverter 4. This voltage can be changed readily, as the inverter 4 is disconnected from the main battery 1 during rheostatic braking. The braking force is adjusted by controlling the DC voltage input to the inverter independently of the main battery voltage.

The required DC input voltage to the inverter 4 is dependent upon the required braking force (braking power) and can be determined by the above equation. The required braking force is then realized by using this input voltage to control the inverter 4.

Since the value of the charging resistance provided in the initial charging circuit for the input smoothing capacitor for the inverter 4 is substantially the same as the braking resistance value, the same resistor can be used for both purposes to provide a small, lightweight, and inexpensive resistor.

When the electric vehicle is started, the input smoothing capacitor is preferably charged within one second. Since the input smoothing capacitor has a capacitance of several millifarads, the initial charging resistor for charging the capacitor within one second will have a resistance in the approximate range from 10 Ω to 50 Ω.

Also, for a general electric vehicle, rheostatic braking power of several kilowatts is required for an effect comparable to internal combustion engine braking. A braking resistance of about 10 Ω to 50 Ω is required for a typical main battery voltage of about 300 V. Thus, the same resistor can be used for both charging and braking.

When the inverter is started, the rheostatic braking circuit is inactivated. During rheostatic braking, the inverter is activated. Thus, starting of the inverter and rheostatic braking are not concurrent.

A resistor used both for charging and braking is inserted into the initial charging side to act as a charging resistor when the inverter is started, and inserted into the rheostatic braking circuit to act as a braking resistor during rheostatic braking.

Figure 2:
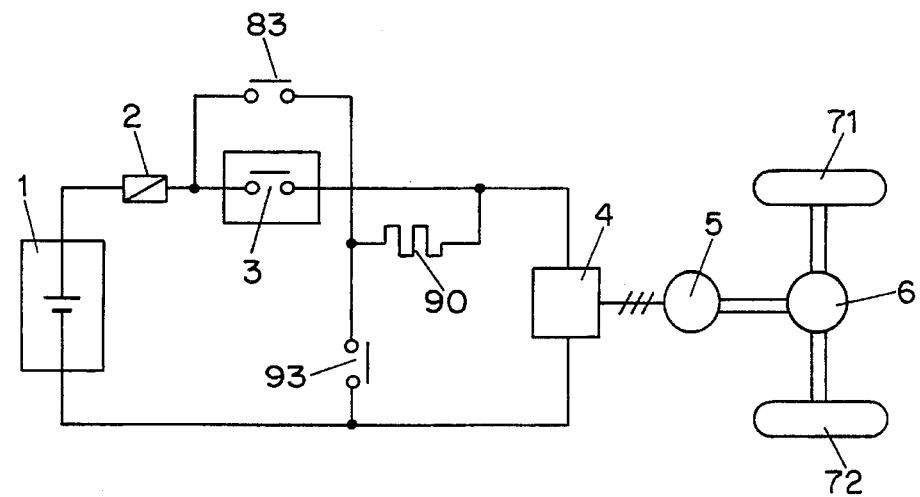
FIG. 2 is a schematic of a preferred second embodiment of the invention.

FIG. 2 shows an embodiment in which the same resistor is used both for the initial charging and the rheostatic braking circuits. An initial charging switch 83 corresponds to the initial charging switch 81 in FIG. 1. A resistor 90 is used both for charging and for braking. One end of the resistor 90 connects to the connection point of the initial charging switch 83 and the rheostatic braking switch 93, the other end connects to the connection point of the main circuit switch 3 and the inverter 4. The remaining features are as in FIG. 1.

During initial charging of the input smoothing capacitor, both the rheostatic braking switch 93 and the main circuit switch 3 are switched off, and initial charging switch 83 is switched on for charging the input smoothing capacitor of inverter 4 via the resistor 90. After charging is completed, the initial charging switch 83 is switched off and the main circuit switch 3 is switched on to start the electric vehicle.

When braking, the rheostatic braking switch 93 is initially switched off. If regenerative braking is enabled, the rheostatic braking switch 93 remains switched off and regenerated power is absorbed by the main battery 1. When the main battery 1 is fully charged, the rheostatic braking switch 93 is switched on and the main circuit switch 3 is switched off to switch from regenerative to rheostatic braking. This activates the rheostatic charging circuit comprising the resistor 90 and the rheostatic braking switch 93. Braking power is adjusted as described for FIG. 1.

When switching from rheostatic braking to motoring, the rheostatic braking switch 93 is switched off and the main circuit switch 3 is switched on to form a motoring circuit for the vehicle to move.

During this switching, the voltage of the input smoothing capacitor 403 of the inverter 4 differs from the main battery voltage, but the input smoothing capacitor 403 is not overcharged when the main circuit switch 3 is switched on because the difference is small.

Figure 3:
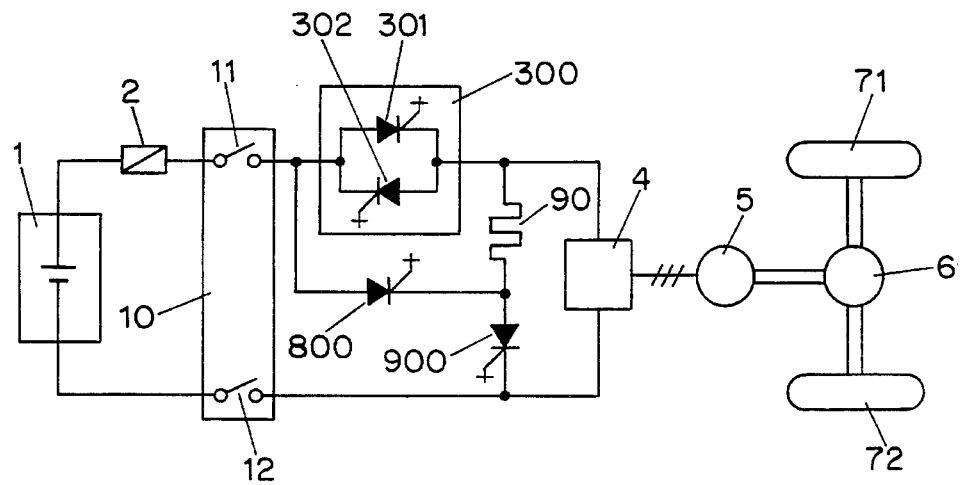
FIG. 3 is a schematic of a preferred third embodiment of the invention.

The embodiment shown in FIG. 3 includes semiconductor switches rather than the mechanical switches of FIG. 2. Like components have the same reference numerals as in FIGS. 1 or 2.

The main circuit switch 300 replacing the main circuit switch 3 of FIGS. 1 and 2 takes the form of a pair of semiconductor switches, including a motoring semiconductor switch 301 in reverse-parallel connection with a regenerative braking semiconductor switch 302. Thus, although a single semiconductor switch can carry current in one direction only, current-carrying capability is provided in both directions.

An initial charging semiconductor switch 800 is included for initially charging the input smoothing capacitor 403 of the inverter 4. Included further is a rheostatic braking semiconductor switch 900.

The mechanical circuit breaker switch 10 switches off the main circuit and does not have a current interrupting function. The switch 10 comprises a positive power line switch 11 and a negative power line switch 12, and can completely break the main circuit. As a semiconductor switch cannot completely interrupt the main circuit, the mechanical switch 10 is used, e.g., for switching off for inspection purposes. Thus, the switches 11 and 12 are switched off for inspecting the circuit; otherwise they remain switched on.

In operation, when the inverter 4 is started to charge the input smoothing capacitor 403 of the inverter 4 from the main battery 1 via the resistor 90, the main circuit switch 300 and the rheostatic braking semiconductor switch 900 are switched off, and only the initial charging semiconductor switch 800 is switched on. After charging is completed, the semiconductor switch 800 is switched off.

The motoring semiconductor switch 301 is switched on to start the inverter 4. During motoring, the semiconductor switch 301 remains on. If a fault occurs in the motoring circuit, the semiconductor switch 301 is switched off to break the circuit.

For regenerative braking, the motoring semiconductor switch 301 is switched off and the regenerative braking semiconductor switch 302 is switched on, so that a regenerative braking circuit is formed. In case of trouble in the regenerative braking circuit, the semiconductor switch 302 is switched off to break the circuit.

If the main battery becomes fully charged and cannot absorb further energy, the rheostatic braking semiconductor switch 900 is switched on and the semiconductor switch 302 is switched off, to switch from regenerative braking to rheostatic braking.

Switching and inverter operations in the embodiment of FIG. 3 are essentially the same as described above with reference to FIG. 2.

Semiconductor switches in the system of FIG. 3 may be GTO thyristors or any other suitable semiconductor switches.

Also, for each one of the switches shown in FIG. 1, a semiconductor switch can be used.

Figure 4:
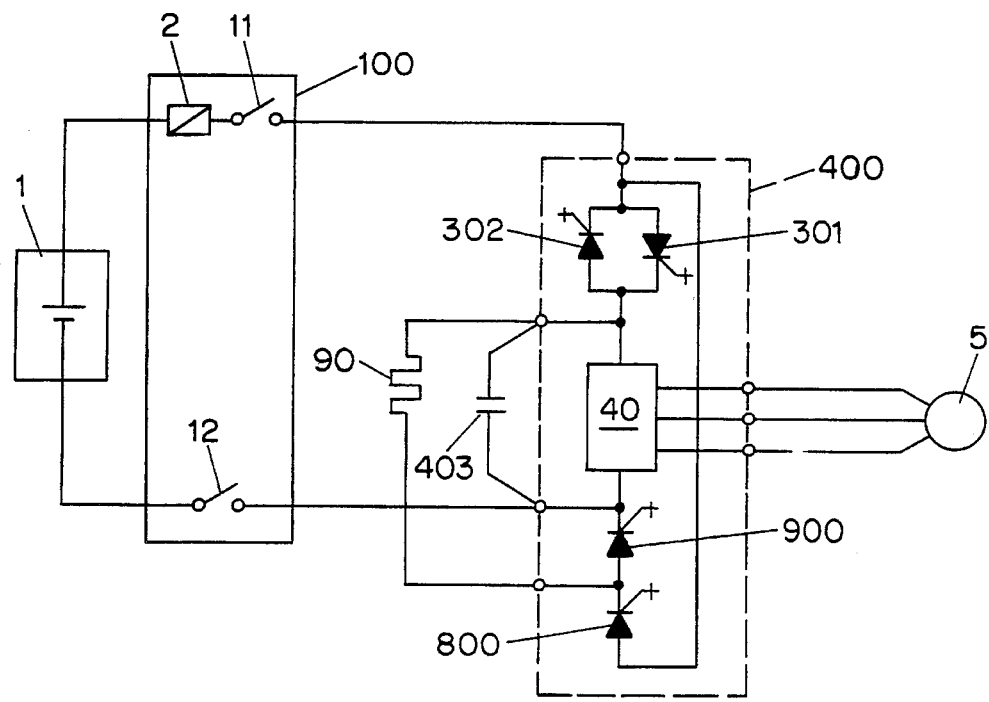
FIG. 4 is a schematic of a preferred fourth embodiment of the invention

In the embodiment according to FIG. 4, semiconductor and other components are integrated.

In FIG. 4, like components have the same reference numerals as in FIG. 3.

FIG. 4 shows an integrated unit 400 comprising the semiconductor switches of the main circuit. A power module 100 comprises a fuse 2 and switches 11 and 12 shown in an open state. A semiconductor switch 40 for the inverter is separate from a conventional input capacitor 403 for the inverter.

The semiconductor switches 40, 301, 302, 800 and 900 are mounted on the same cooling body for the integrated unit 400.

Figure 5:
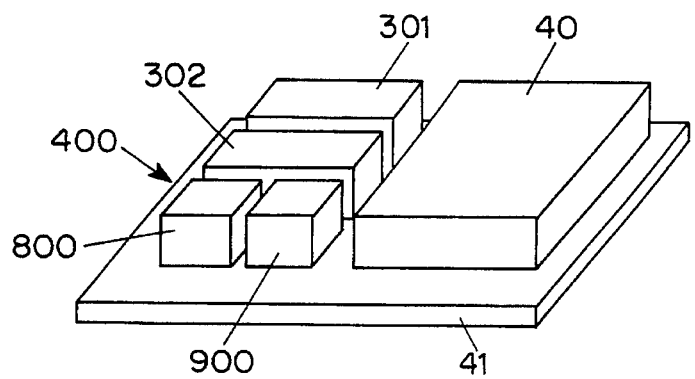
FIG. 5 is a perspective of a semiconductor module as preferred in the embodiment according to FIG. 4.

FIG. 5 shows the integrated unit 400 with a cooling plate 41 on which the semiconductor switches 40, 301, 302, 800 and 900 are mounted.

Figure 6:
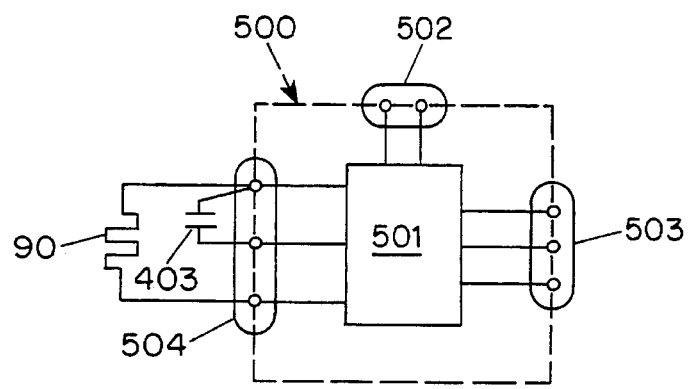
FIG. 6 is a schematic of a preferred fifth embodiment of the invention.

FIG. 6 shows an integrated unit like unit 400, modularized.

The semiconductor module 500 comprises a semiconductor switch part 501 having the functions of the semiconductor switches 40, 301, 302, 800, and 900 in FIG. 5, and connection terminals for other equipment. Terminal 502 is for connection to the main battery side, terminal 503 is for connection to the motor 5, and terminal 504 is for connection to the capacitor 403 and the resistor 90.

If electromagnetic noise from the semiconductor module 500 causes interference, shielding of the module 500 is indicated.

Figure 7:
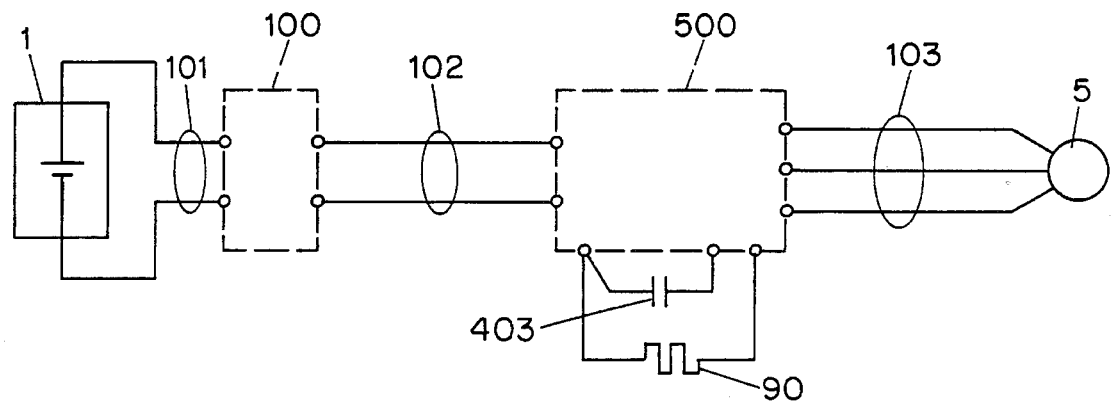
FIG. 7 is a schematic of a preferred sixth embodiment of the invention.

FIG. 7 illustrates wiring interconnections between parts and modules. For like parts, the same reference numerals are used as in FIGS. 1 to 6.

In FIG. 7, wiring 101 connects the main battery 1 to a power-supply-side module 100. Wiring 102 connects the power-supply-side module 100 to the semiconductor module 500. Wiring 103 connects the semiconductor module 500 to the motor 5.

Wires that generate little electromagnetic noise, e.g., paired cables, parallel laminated wires, stranded wires, or coaxial cables, are preferred for wirings 101, 102, and 103.

Low-noise wires 102 and 103 can also be used in structures which are not modularized, e.g., for wiring between semiconductor switches 40, 301, 302, 800 and 900 and other components in the embodiment of FIG. 5.

We claim:

1. An electric system for an electric vehicle, comprising:

an AC motor for driving one or more wheels of the vehicle;

a battery having a DC output;

power converter means having a DC side operatively coupled to the battery and an AC side operatively coupled to the motor, for converting DC power from the battery to AC power for the motor, and having a regenerative function for rectifying AC power from the motor to DC power to the battery, and comprising an input smoothing capacitor connected to the DC side;

an initial charging circuit connected between the battery and the input smoothing capacitor, for charging the input smoothing capacitor and for starting the power converter means, and comprising a charging resistor and a charging switch which is switched on for charging the input smoothing capacitor when the power converter means is started;

a main circuit switch, connected between the battery and the power converter means in parallel to the initial charging circuit, which is switched on when the power converter means converts DC power to AC power and when the power converter means regenerates DC power from the motor to the battery;

a rheostatic breaking circuit connected to the DC side of the power converter means in parallel to the battery, for braking the electric vehicle when the voltage of the battery exceeds a level above which DC power from the power converter means can not be regenerated to the battery, and comprising a braking resistor for dissipating DC power from the power converter means and a braking switch connected in series to the braking resistor, which is switched on to connect the DC power from the power converter means to the braking resistor, wherein a single resistor serves as charging resistor and as braking resistor.

2. The electric system of claim 1, further comprising a mechanical circuit breaker switch operatively coupled between the battery and the main circuit switch.

3. The electric system of claim 1, wherein each one of the initial charging switch and the braking switch comprises a semiconductor switch.

4. The electric system of claim 3, further comprising a cooling member on which are mounted the initial charging switch, the braking switch, and at least one switch of the power converter means.

5. The electric system of claim 4, wherein the initial charging switch, the braking switch, and the at least one switch of the power converter means are integrated as a semiconductor module having terminals for connecting to external equipment.

6. The electric system of claim 5, wherein the semiconductor module is connected to the battery and to the external equipment by wiring with low electromagnetic noise emission.

7. The electric system of claim 6, wherein the wiring comprises parallel laminated wire.

8. The electric system of claim 6, wherein the wiring comprises stranded wire.

9. The electric system of claim 6, wherein the wiring comprises coaxial cable.

* * * * *